March 10, 1959   W. A. CSABI   2,876,998
HEATER AIR CONDITIONING DUCTWORK
Filed Oct. 18, 1956   2 Sheets-Sheet 1

W. A. CSABI
*INVENTOR.*

BY  E. C. McRae
    J. B. Faulkner
    T. H. Oster

ATTORNEYS

March 10, 1959  W. A. CSABI  2,876,998
HEATER AIR CONDITIONING DUCTWORK
Filed Oct. 18, 1956  2 Sheets-Sheet 2

W.A. CSABI
*INVENTOR.*

BY E.C. McRae
J.B. Faulkner
O.H. Oster

ATTORNEYS

United States Patent Office 2,876,998
Patented Mar. 10, 1959

2,876,998

HEATER AIR CONDITIONING DUCTWORK

William A. Csabi, Allen Park, Mich., assignor to Ford Motor Company, Dearborn, Mich., a corporation of Delaware Application October 18, 1956, Serial No. 616,753

4 Claims. (Cl. 257—7)

The present invention relates to a novel combination of ductwork and controls for heating, cooling, and defrosting the inside of a motor vehicle or the like.

In the present invention the applicant provides an outside and an inside air return of which one or the other or both are used. The air from these sources is brought into the ductwork by means of a conventional blower, and directed by a manually positioned damper through either the heater core for heating and defrosting, or through the evaporator for cooling. If cool air is desired, the damper directs the air upward through the evaporator, a funnel like opening and a transverse tube and then through selectively positioned openings in the dash panel adjacent the inside of the windshield. A rectangular shaped connector duct connects the transverse tube with the top of the plenum chamber positioned below it. The plenum chamber is then provided with a plurality of openings through which air is vented into the passenger compartment. Because the air going through the evaporator is cooled, a certain portion of it will go down the rectangular ductwork and into the plenum chamber and thence into the area of the front seat occupant's feet. If the heater or defroster is desired, the manually positioned damper shuts off the evaporator and the air is forced downwardly through the heater core into the plenum chamber and out of the openings in the plenum chamber. A plenum chamber damper is provided in the plenum chamber adjacent the opening into the connector duct for a number of purposes. In the closed position in which the majority of the heat is wanted about the feet of the occupants, the damper shuts off all but a small amount of air which rises upwardly through the connector ductwork and through the openings adjacent the windshield. Because the warm air tends to rise it will have no difficulty making this travel.

In event a defrosting action is required the plenum chamber damper is manually positioned downwardly to direct the air in the plenum chamber upwardly to the openings adjacent the windshield. However, the damper is narrower than the area in which it's located providing an air space on each side of the damper through which a certain amount of air will pass and be permitted to exhaust through a number of openings opposite the passenger's seat. One of the objects, therefore, is to provide a compact ductwork and control arrangement for air conditioning, heating, and defrosting the interior of a motor vehicle.

Still another object is to provide a simply constructed, easily operated, and low cost heater-defroster-air conditioning system.

A further object is to provide a common ductwork arrangement conveniently operated for cooling, heating, and defrosting of a motor vehicle interior.

Other objects and advantages will become more apparent when considered in connection with the accompanying drawings wherein.

Figure 1:
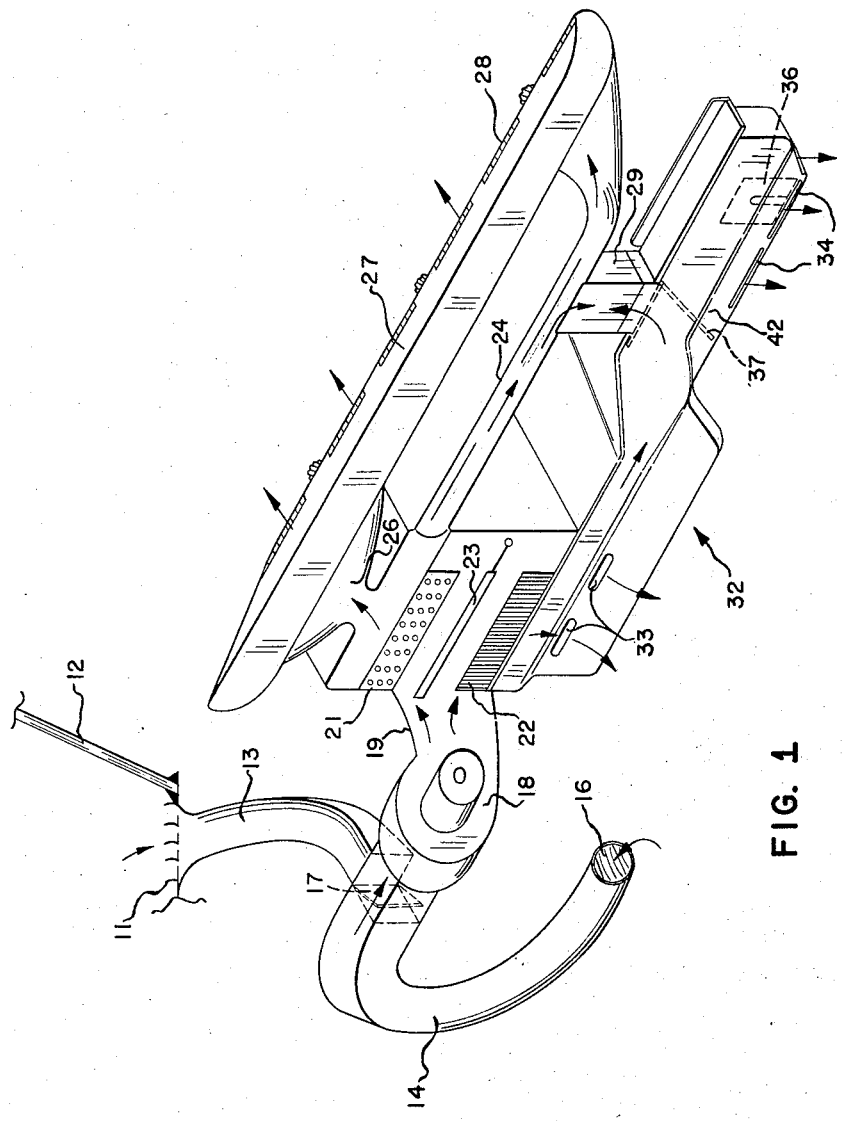
Figure 1 is a semi-diagrammatic view of the combination heater, defroster and air conditioning unit constructed in accordance with the applicant's invention.

Referring now to the drawings, the applicant has provided a louvered air inlet 11 for the entrance of outside air adjacent the front of the windshield 12 of an automotive vehicle or the like. Conduit 13 directs the air from the air inlet 11 to a connection with a second conduit 14 which has a louvered opening 16 located inside of the passenger compartment. A return air damper 17 may be manually adjusted to permit the use of either all of the passenger compartment return air or all of the outside air or a combination thereof as may be desired by the occupants.

A conventional sirocco blower 18 directs the air into the main conduit system 19 from which it is directed through an evaporator 21 or a heater core 22 as desired. A manually controlled damper 23 is positioned so that it will prevent the passage of air through either the evaporator 21 or the heater core 22 so that heating and defrosting and/or cooling may be selectively chosen.

In the event that the cooling of the vehicle is selected, air sucked in by the blower 18 passes through the evaporator 21 and is kept from going through the heater core 22 by the closed position of the damper 23. After passing through the evaporator 21, where it is cooled, some of the air passes through funnel-like opening 26 into the main chamber 27 while some more of the air passes through a transversely aligned cylindrical tube 24 substantially the extent of the windshield width and then into the main chamber 27 at the outer end. The air in the main chamber 27 is then exhausted through a plurality of manually adjustable louvers 28 against the windshield of the vehicle or against the passengers as may be desired by the occupants. Laterally inwardly of the tube 24 opening into the main chamber 27 is a rectangular depending connector duct 29 which connects the tube 24 to an opening 31 in the top of the plenum chamber generally indicated at 32.

As can be seen in Figure 1, the heater core 22 is located in the top of the plenum chamber 32 and secured thereto by conventional means not shown. In the lower section of the plenum chamber 32 there is provided a plurality of forward elongated openings 33 and a plurality of downward openings 34 through which heated or cooled air may be vented into the passenger compartment. The elongated openings 33 and 34 direct the air toward the front seat occupants. In order to exhaust a greater amount of air in the passenger compartment, a hinged door 36 is provided on the back of the plenum chamber 32 which may be manually opened or closed as may be desired by the occupants of the vehicle. Although not shown in the drawings, the plenum chamber is positioned on the inside of the passenger compartment and secured in a conventional manner by conventional means to the fire wall of the vehicle.

Figure 3:
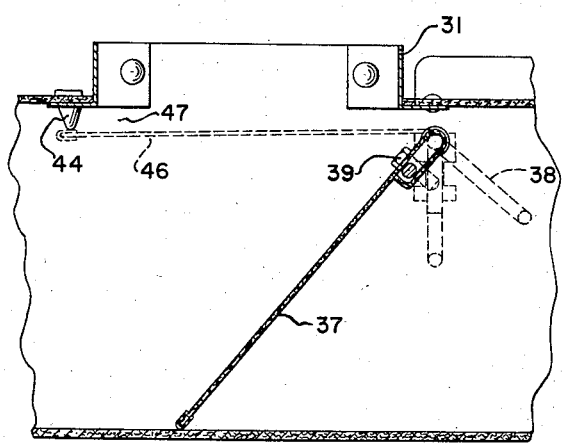
Figure 3 is a fragmentary enlarged cutaway of the defroster damper.
Figure 4:
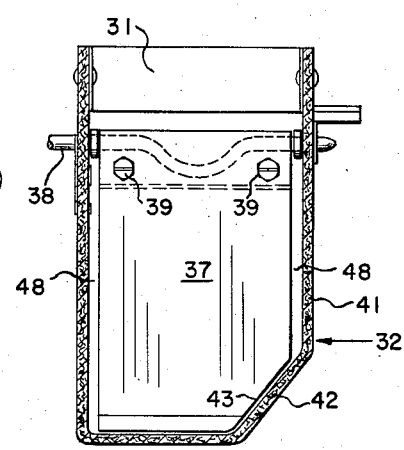
Figure 4 is a cross section view taken on the plane indicated by the line 4—4 of Figure 2.
Figure 2:
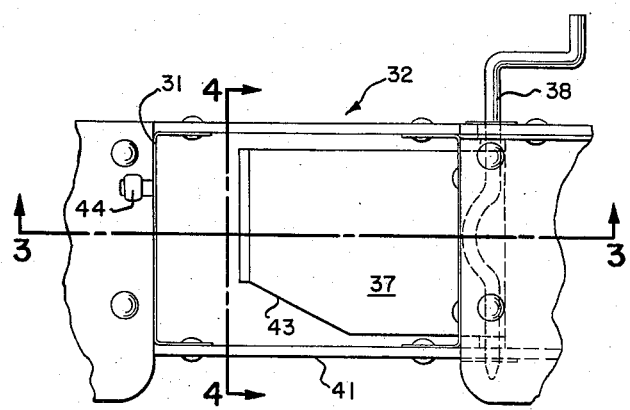
Figure 2 is a plan elevational view of the defroster plenum chamber damper partly in section.

Referring now to the plenum chamber 32 which is best shown in Figures 2 through 4, there is provided a manually controlled defroster damper 37 secured to a bell crank arm 38 by means of bolts 39. As can be seen in the drawings, the forward wall 41 is angled sharply near the bottom of the plenum chamber to provide a radius 42 in that section of the plenum chamber 32 adjacent the bottom edge. The damper 37 operates within the area of the plenum chamber 32 and has an angled edge 43 which corresponds to the radius 42. In the open defroster position heated air in the plenum chamber, as shown in Figures 2, 3 and 4, is directed against the angled defroster damper 37, is sucked upwardly through the connector duct 29 and into the main compartment 27 and through the louvers 28. The damper 37 is narrower, however, than the cross section of the plenum chamber thus providing vertical spaces 48 on each side of the damper allowing some air to be exhausted out openings 34, and 36, if the latter is open.

A bumper 44 of synthetic or natural elastomer depends downwardly from the top of the plenum chamber adjacent the opening 31 a predetermined distance into the plenum chamber cavity so as to prevent the damper 37 from completely shutting off connector duct 29. In the position shown at 46 a space 47 is provided by positioning the damper 37 against the bumper 44 which allows some of the heated air to rise and be exhausted through the louvered openings 28. It can thus be seen that either in the closed position of 46 or the position shown in 37 a limited amount of air will bypass the damper to go upwards through the connector 29 or outwardly through openings 34 and hinged door 36 in the plenum chamber 32. Because warm air will rise, a predetermined amount of this air will proceed upwardly through the connector tube 29 even though the damper 37 is in the closed position of 46. When defrosting is desired, the damper 37 will be positioned as shown in Figure 3 and a predetermined amount of air will, of course, be exhausted through the openings 33 and through the openings 34 and 36, the latter two openings representing the air bypassing the damper 37 through the spaces 48.

Thus it can be seen that even where air conditioning is required, a predetermined amount of cool air is directed to the lower section of the passenger compartment. When the damper 37 is adjusted so that the heater core is used, a predetermined amount of the warm air will rise through the connector duct 29 and outwardly through the louvers 28 even though the greater amount of the heat is directed downwardly about the occupant's feet. In either case of heating or cooling the same ductwork is used.

It is to be understood that the invention is not to be limited to the exact construction shown and described, but that various changes and modifications may be made without departing from the spirit and scope of the invention, as defined in the appended claims.

What is claimed is:

1. A combined heater-air conditioning-defroster ductwork for an automotive vehicle comprising in combination a forward occupant compartment and a fixed windshield, manually selectable air return means including a first air inlet open to atmosphere, a second air inlet open to the inside of the vehicle, conduit means interconnecting said inlets, and means for selectively controlling the air entering said inlets, power means connected to said air inlets for drawing air through the air inlet, an evaporator, a heater core, an air passage from the power means to the evaporator and heater core, a damper manually adjustable for selectively directing air through the evaporator or heater core respectively, a vented main air chamber, air passage means connecting the evaporator to the main air chamber, a plenum chamber, access means in the plenum chamber open to the heater core and vent means open to the forward occupant compartment, a depending defroster-heater air duct connecting said air passage means to the plenum chamber, a manually adjustable defroster damper mounted in the plenum chamber adjacent the defroster-heater air duct and movable from a wide open position to a partially open position relative to said defroster-heater air duct whereby selective positioning of said damper will control the amount of air traveling through the defroster-heater air duct.

2. The structure defined by claim 1 which is further characterized in that said depending duct is rectangular in shape and that said plenum chamber has an elastomer spacer extending downwardly into said plenum chamber preventing the complete closing of the depending air duct by the defroster damper.

3. The structure defined by claim 1 which is further characterized in that the depending defroster-heater air duct connects the plenum chamber inwardly of its ends and that the vent means comprises a plurality of slotted holes in the plenum chamber laterally spaced on each side of the depending defroster-heater air duct, and that the defroster damper is narrower in width than said plenum chamber and when in the fully open position the damper defines an air passage on each side of said damper permitting a predetermined amount of air to be exhausted out the slotted holes behind the said damper.

4. A combined heater-air conditioning-defroster ductwork system for an automotive vehicle having a fixed windshield and a front passenger compartment comprising in combination an outside air return adjacent the outside of the windshield and an inside air return in said front passenger compartment, a blower conduit means connecting the inside and outside air returns to said blower, a manually positioned air return damper interposed between the air returns and the blower for selecting the air return desired, an evaporator unit and a heater core positioned in opposed relationship to each other, means including a common passageway connecting the blower to the evaporator unit and the heater core, a second damper interposed between the evaporator unit and the heater core for selectively directing the air through either the evaporator unit or the heater core respectively, ductwork means positioned above the evaporator unit and connected thereto including a generally transversely extending cylindrical tube having openings at both ends open to a vented main air chamber inwardly adjacent the inside of said windshield, a plenum chamber defining an elongated box-like structure provided with a plurality of vent slots open to the passenger compartment, a vent open to the heater core and a square opening below the cylindrical tube, a depending duct connecting the cylindrical tube and the plenum chamber about the square opening, a defroster damper pivotally mounted transversely of the plenum chamber adjacent the square opening, a resilient bumper extending into the plenum chamber and preventing the complete closure of the depending duct by the defroster damper whereby regardless of the position of the defroster damper a predetermined amount of air will move upwards or downwards through said depending duct and subsequently through the vented main chamber and the plurality of plenum chamber vent slots.

References Cited in the file of this patent
UNITED STATES PATENTS

| | | |
|---|---|---|
| 2,264,848 | Kahl | Dec. 2, 1941 |
| 2,747,842 | Shataloff | May 29, 1956 |